United States Patent
Takehara et al.

(10) Patent No.: US 7,021,830 B2
(45) Date of Patent: Apr. 4, 2006

(54) SEAL RING AND ROLLING BEARING UNIT WITH SEAL RING

(75) Inventors: Tetsu Takehara, Fujisawa (JP); Kinji Yukawa, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/955,337

(22) Filed: Sep. 24, 2004

(65) Prior Publication Data

US 2005/0089254 A1    Apr. 28, 2005

Related U.S. Application Data

(63) Continuation of application No. PCT/JP03/03527, filed on Mar. 24, 2003.

(30) Foreign Application Priority Data

Mar. 25, 2002  (JP)  ............... 2002-083135
Dec. 5, 2002   (JP)  ............... 2002-353397

(51) Int. Cl.
  *F16C 33/78*  (2006.01)
(52) U.S. Cl. .................. 384/486; 384/484
(58) Field of Classification Search ............ 384/484, 384/485, 486, 544; 277/351, 353, 571
See application file for complete search history.

(56) References Cited

U.S. PATENT DOCUMENTS

| | | | |
|---|---|---|---|
| 3,822,890 A * | 7/1974 | Bourgeois | 277/348 |
| 4,962,936 A * | 10/1990 | Matsushima | 277/364 |
| 5,803,617 A | 9/1998 | Ohnuki et al. | |
| 6,206,380 B1 | 3/2001 | Miyazaki | |
| 6,375,195 B1 * | 4/2002 | Robotham | 277/394 |
| 6,497,514 B1 * | 12/2002 | Maldera et al. | 384/486 |

FOREIGN PATENT DOCUMENTS

| | | |
|---|---|---|
| EP | 1 041 387 | 10/2000 |
| JP | 61-182461 | 11/1986 |
| JP | 63-16929 | 5/1988 |
| JP | 1-115070 | 8/1989 |
| JP | 2-113173 | 4/1990 |
| JP | 4-10164 | 1/1992 |
| JP | 4-62966 | 5/1992 |
| JP | 5-73364 | 10/1993 |
| JP | 5-73365 | 10/1993 |
| JP | 2507600 | 5/1996 |
| JP | 09-287619 | 11/1997 |
| JP | 10-252762 | 9/1998 |
| JP | 11-304827 | 11/1999 |

OTHER PUBLICATIONS

International Search Report dated Jul. 1, 2003.
Translation of International Preliminary Examination Report dated Jun. 15, 2004.

* cited by examiner

*Primary Examiner*—Thomas R. Hannon
(74) *Attorney, Agent, or Firm*—Katten Muchin Rosenman LLP

(57) ABSTRACT

It is intended that the rotation resistance is decreased while the durability and seal performance are kept in the rolling bearing unit with seal ring.

The most thin wall-thickness portion 30 is provided in the vicinity of the base end of the seal lip 22a projecting laterally in sliding contact with the mating surface. The most thick wall thickness portion 31 is provided adjacent to the most thin wall thickness portion 30 on the tip end side. The thickness is gradually decreased from the most thick wall thickness portion 31 to the tip end. Further, the ratios of thickness in the respective portions 22a are properly controlled.

5 Claims, 17 Drawing Sheets

PRIOR ART

PRIOR ART

SEAL RING AND ROLLING BEARING UNIT WITH SEAL RING

CROSS-REFERENCE TO RELATED APPLICATION

The present application is a continuation of International Application No. PCT/JP03/03527 which was filed on Mar. 24, 2003, which is herein incorporated by reference.

TECHNICAL FIELD

This invention is related, for example, to the improvement of a seal ring for closing the opening end of the rolling bearing unit for supporting the wheels of a vehicle (automobile) on a suspension device. More specifically, it is intended to improve the sealing performance, i.e., the performance of preventing foreign objects such as muddy water from entering the inside of the internal space in which rolling members are arranged and preventing a grease applied inside of this internal space from leaking out, and at the same time to realize a low friction structure and a low abrasion structure. Then, it is an object to improve the traveling performance of a vehicle represented by fuel consumption performance and acceleration performance and simplify the maintenance and management of the above rolling bearing unit.

BACKGROUND OF THE INVENTION

The rotatable supporting structure of various types of mechanical devices is implemented with a rolling bearing such as a ball bearing, a cylindrical roller bearing, or a tapered roller bearing. This kind of the rolling bearings is implemented with a seal ring to prevent the grease applied inside of the internal space of this rolling bearing from leaking out and prevent various types of foreign objects such as rain water, mud, dust from entering the inside of the roller bearing. FIG. 18 is a schematic diagram showing the structure of one example of the rolling bearing unit with seal ring having this kind of the seal ring for rotatably supporting the driven wheels of a vehicle on a suspension device.

The above rolling bearing unit with seal ring is composed of an outer race 1, a hub 2, and a plurality of rolling members 3, 3. The hub 2 of these elements is composed of a hub body 4 and an inner race element 5 in combination. Also, there are rollingly provided more than one of the respective rolling members 3, 3 between each of the outer raceways 6 and 6 formed on the inner peripheral surface of the above outer race 1 and the inner raceways 7 and 7 formed on the outer peripheral surface of the above hub 2. At the time of use, i.e., when wheels are supported on the suspension device of a vehicle, the above outer race 1 is fixed to a knuckle 8 constituting the suspension device while the wheels are securely connected to an attachment flange 9 of the above hub body 4. Also, a spline shaft 12 provided on a constant velocity joint 11 is engaged with a spline hole 10 opened through the central location of this hub body 4.

With the rolling bearing unit with seal ring as described above, the internal space 13 accommodating the above respective rolling members 3, 3 is filled with a grease to lubricate the rolling contact portion between the rolling contact surfaces of the respective rolling members 3, 3 and the above respective outer raceways 6 and 6 and the inner raceways 7 and 7. Also, seal rings 14a and 14b are provided respectively between the inner peripheral surface of the above outer race 1 at each of the opposite ends and the outer peripheral surface of the inner end of the above inner race element 5 and the intermediate portion of the above hub body 4 to close the openings of the above internal space 13 at each of the opposite ends.

FIG. 19 illustrates the configuration of the seal ring 14a which is one of the seal rings 14a and 14b serving to close the opening at the inner end of the above internal space 13 (the inner side in the axial direction means the side closer to the center in the width direction of a vehicle in which the unit is assembled, and conversely the outer side means the outer side in the width direction, which definitions are applicable throughout this specification). This seal ring 14a is called a combination seal ring and composed of a metal core 15, a slinger 16 and a sealing member 17. The metal core 15 among these elements is formed as an annular ring in whole having an L-shaped cross section, and composed of an outer cylindrical portion 18 which can be fitted and fixed into the inner peripheral surface of the end portion of an outer race 1 and an outer circular ring portion 19 which is inwardly bent in the radial direction from the axially outer edge of this outer cylindrical portion 18.

Also, the above slinger 16 is formed as an annular ring having an L-shaped cross section, and composed of a radially inner cylindrical portion 20 which can be fitted and fixed onto the outer peripheral surface of the end portion of said inner race element 5 and an inner circular ring portion 21 which is outwardly bent in the radial direction from the axially inner edge of this radially inner cylindrical portion 20. Furthermore, the above sealing member 17 is made of a resilient material, for example, an elastomer such as a rubber, and provided with three seal lips 22 to 24 whose base end portion is fixedly connected to the above metal core 15. The seal lip 22, which is called a side lip and provided in the most outer location to inwardly project in the axial direction, has the tip edge to be in slidable contact with the axially outer surface of the inner circular ring portion 21 of the slinger 16 around the entire circumference. On the other hand, the remaining two seal lips 23 and 24 have tip edges to be in slidable contact with the outer peripheral surface of the radially inner cylindrical portion 20 of the above slinger 16 around the entire circumference.

On the other hand, the seal ring 14b closing the opening of the above internal space 13 at the outer end is composed of a metal core 25 and a sealing member 26 as shown in FIG. 20. This sealing member 26 is made of a resilient material, for example, an elastomer such as a rubber, and provided with three seal lips 27 to 29 whose base end portion is fixedly connected to the above metal core 25. The seal lip 27, which is called a side lip and provided in the most outer location to outwardly project in the axial direction, has the tip edge to be in slidable contact with the inner surface of the base end portion of said attachment flange 9 around the entire circumference. On the other hand, the remaining two seal lips 28 and 29 have tip edges to be in slidable contact respectively with the portion continuing between the inner surface of this base end portion of the attachment flange 9 and the outer peripheral surface of the intermediate portion of said hub body 4, or with this outer peripheral surface of the intermediate portion around the entire circumference, respectively.

By closing the openings of the above internal space 13 at each of the opposite ends respectively with the seal rings 14a and 14b as described above, foreign objects such as muddy water from is prevented from entering the inside of the above internal space 13 while the grease applied inside of this internal space is prevented from leaking out. Incidentally, in the case of the prior art structure, the seal lips 22 and 27, which are located in the most outer positions exposed to foreign object such as muddy water among the three seal lips 22 to 24 and the three seal lips 27 to 29 constituting the above seal rings 14a and 14b respectively, and the intermediate seal lip 28 of the seal ring 14b are designed to have an approximately constant thickness from each base end portion to the corresponding tip portion.

In order to improve the sealing performance of the seal rings 14a and 14b as described above, it is required to have a good sliding contact condition of each tip edge portions of the respective seal lips 22 to 24 and 27 to 29 constituting these seal rings 14a and 14b with the corresponding counterpart surfaces. On the other hand, the sliding contact condition of the seal lips 22 and 27, which are located in the most outer positions among the seal lips 22 to 24 and 27 to 29 constituting the above seal rings 14a and 14b respectively, with the corresponding counterpart surfaces tends to be inappropriate because of assembling errors or the elastic deformation of the respective elements while the vehicle is moving.

Explaining this point with the seal ring 14a closing the opening of the internal space 13 at the inner end thereof as an example, there is the possibility of degrading the sliding contact condition between the tip edge portion of the above seal lip 22 and the outer surface of the inner circular ring portion 21 of this slinger 16 due to the displacement of the slinger 16 relative to the metal core 15 in the axial direction. That is, there is the possibility that, when the above seal ring 14a is installed in the opening of the above internal space 13 at the inner end, the relative position between the above metal core 15 and the above slinger 16 in the axial direction is displaced to some extent. In this case, the distance between the outer circular ring portion 19 of the above metal core 15 and the inner circular ring portion 21 of the above slinger 16 deviates from the design value. For example, when this distance falls below the design value, the interference (the amount of elastic deformation) of the above seal lip 22 increases resulting in a higher contact pressure at the slidably contacting region between the tip edge portion of this seal lip 22 and the outer surface of the above inner circular ring portion 21. As a result, the sliding resistance (seal torque) at this slidably contacting region increases, and therefore it becomes likely that the above seal lip 22 wears and becomes limp, and the durability of the above seal ring 14a is hardly maintained.

Conversely, when the above distance exceeds the design value, the interference of the above seal lip 22 decreases resulting in a lower contact pressure at the slidably contacting region between the tip edge portion of this seal lip 22 and the outer surface of the above inner circular ring portion 21. As a result, the sealing performance of the above seal lip 22 is degraded and therefore it is difficult to sufficiently prevent foreign objects from entering the above internal space 13.

On the other hand, the elastic deformation of the respective elements, occurring when the vehicle is moving, makes inappropriate the sliding contact condition at the tip edge portions of the seal lips 22 and 27 with the corresponding counterpart surfaces. That is, the central axis of the above hub 2 may quickly be tilted relative to its neutral position due to the elastic deformation of the respective components of the rolling bearing unit on the basis of the moment exerted on the hub 2 through the attachment flange 9 from the land surface, with which the tires constituting wheels come in contact during the vehicle turns. In such a case, the sliding contact condition between the tip edge portions of the seal lips 22 and 27 and the corresponding counterpart surfaces becomes uneven, and therefore there is a problem that the sealing performance and the durability of the seal lips 22 and 27 are degraded and the like problem. This point will be explained with the seal ring 14a at the inner opening of the above internal space 13 as an example with reference to FIGS. 21 to 22.

As illustrated in FIG. 21 with an arrow, it is assumed for explanation that a moment M is applied to the above hub 2, during a turning motion, in the clockwise direction of FIG. 21. In this case, the central axis of the above hub 2 is displaced by an angle θ from the location α indicative of its neutral position to the location β due to the elastic deformation of the respective elements. As a result, the inner circular ring portion 21 of the slinger 16 fitted and fixed onto the inner end of the inner race element 5 constituting the above hub 2 is also tilted approximately by the above angle θ. In the case of the situation as illustrated in FIG. 21, in the upper portion as viewed in the same figure, the above inner circular ring portion 21 is displaced apart from the metal core 15 as illustrated in FIG. 22 (A). As a result, the interference of the seal lip 22 decreases in the above upper portion of FIG. 21. On the other hand, in the lower portion as viewed in FIG. 21, the inner circular ring portion 21 is displaced closer to the metal core 15 as illustrated in FIG. 22 (B). As a result, the interference of the above seal lip 22 increases in the above lower portion of FIG. 21. Conversely, the seal ring 14b, closing the opening of the internal space 13 at the outer end, moves in the reverse direction to the seal ring 14a at the above inner end. Anyways, the foreign object blocking performance of the respective seal lips 22 and 27 is impaired in the location where the interference of the above seal lips 22 and 27 of either the seal ring 14a or 14b is lowered.

Because of this, in the prior art technique, the interferences of the above respective seal lips 22 and 27 are determined in order that, even when the central axis of the above hub 2 is tilted on the basis of the above moment load M to decrease the interferences of the above seal lips 22 and 27 in a location, the sealing performance is secured in the location. More specifically, the interferences of the respective seal lips 22 and 27 are determined to be somewhat larger with the above central axis being not tilted in order that, even if the above central axis is tilted, these respective seal lips 22 and 27 maintain at least minimum residual interferences required of the respective seal lips 22 and 27 to secure the sealing performance around the entire circumference. However, when the interference is set to be somewhat larger, it results, as the cost of securing the sealing performance during a turning motion, in that the sliding resistances of the above respective seal lips 22 and 27 increases and, in addition to this, that these respective seal lips 22 and 27 tend to wear and become limp. The increase in the sliding resistance results in the increase in the rotational resistance of the above hub 2 and the deterioration of the traveling performance represented by fuel consumption performance and acceleration performance, and therefore it is not preferred. However, it is also not preferred that they tend to wear and become limp because the degradation of the durability of the rolling bearing results therefrom.

Taking into consideration the above circumstances, the structure in which a thinned portion is formed at the base end portion of a seal lip for the purpose of decreasing the influence of the variation of the interference of the seal lip upon the pressure change of the slidably contacting region is described in JP Utility Model Publication No. Jitukai Hei 5-73364 and JP Utility Model Publication No. Jitukai Hei 5-73365. In accordance with this structure, the contact pressure between the tip edge portion of the seal lip and the counterpart surface is less influenced by the variation of the interference of the seal lip due to the tilt of the central axis of a hub during a turning motion or because of assembling errors. In other words, even when the above interference varies, this contact pressure less varies. Because of this, even when the interference is set to be somewhat larger, the sliding resistance of the seal lip can be inhibited from increasing as well as the abrasion of this seal lip can be suppressed.

However, in the case of the structure as described in the above utility model publications, the profile of the entirety of the seal lip is not considered while considering only the reduction in material thickness of the base end portion of the seal lip. For this reason, when this seal lip is urged against the slinger, a major part of the elastic deformation of this seal lip is concentrated to the thinned portion of the base end portioen of this seal lip. Because of this, the strain of this thinned portion increases, and therefore relaxation or stress reduction becomes likely in the rubber material constituting this seal lip. As a result, the contact pressure at the slidably contacting region between the tip edge portion of this seal lip and the above slinger is decreased with time, and there is the possibility that the initial sealing performance cannot be maintained at a relatively earlier stage. Particularly, when the above thinned portion is relaxed to degrade the following performance of the tip edge portion of the above seal lip with respect to the mating surface and let the slinger move depart from this seal lip, the surface pressure at the slidably contacting region between the tip edge portion of this seal lip and the slinger is extremely lowered to significantly degrade the foreign object blocking performance of this seal lip.

Taking into consideration the above circumstances, the present invention is made for the purpose of simultaneously meeting the contradictory requirements, i.e., decreasing the frictional resistance of a seal lip and improving the durability thereof, without compromising the sealing performance of this seal lip. Namely, the present invention is made for the purpose of realizing the structure in which the contact pressure at the slidably contacting region between the tip edge portion of a seal lip and the counterpart surface is less influenced by the variation of the interference due to the tilt of the central axis of a hub on the basis of assembling errors and a moment load while the tip edge portion of the seal lip can sufficiently follow the axial displacement variation of the slidably contacting region of a slinger caused in the axial direction by this tilt.

DISCLOSURE OF THE INVENTION

Among the seal rings and the rolling bearing units with seal ring as configured according to the present invention, the seal ring according to a first aspect is provided with a seal lip, in the same manner as the known seal ring as described above, which is made of a resilient material in the form of a circular ring in whole with a tip edge being in slidable contact with the adjacently located counterpart surface around the entire circumference.

Particularly, in the case of the seal ring according to the present invention, the above seal lip is formed with a most thin portion having a smallest thickness in the vicinity of the base end portion thereof. Then, a most thick portion having the largest thickness is provided adjacent to this most thin portion in the side of the tip edge, and shaped with the thickness being gradually decreased from this most thick portion to the tip edge portion.

And, preferably, the thicknesses of the respective elements are controlled. That is, provided that the thickness of the most thick portion is $t_1$, while a phantom line is defined which passes the center in the thickness direction of the seal lip, and provided that the thickness of this seal lip is $t_2$ at the center position of this phantom line from the most thick portion to the tip edge of the seal lip, and that the thickness of the tip edge is $t_3$, then it is satisfied that $0.6 \leq t_2/t_1 \leq 0.9$ and $0.3 \leq t_3/t_1 \leq 0.7$, preferably $0.70 \leq t_2/t_1 \leq 0.85$ and $0.35 \leq t_3/t_1 \leq 0.65$.

Incidentally, while the above seal lip may be provided with a notch, a projection or the like for several reasons, the above thicknesses $t_1$, $t_2$ and $t_3$ in the case where such a notch or a projection is formed are defined on the assumption that such a notch, a projection or the like does not exist.

Furthermore, the rolling bearing unit with seal ring according to another aspect is composed of an outer race with an outer raceway in the inner peripheral surface, an inner race with the inner raceway on the outer peripheral surface, a plurality of rolling members rollingly provided between the outer raceway and the inner raceway, and a seal ring closing the opening at the end portion of a space located between the inner peripheral surface of the above outer race and the outer peripheral surface of the above inner race in the same manner as the known seal ring as described above.

Particularly, in the case of the rolling bearing unit with seal ring according to this aspect, the above seal ring is any of the seal rings as described above.

Incidentally, the above rolling bearing unit with seal ring includes a so-called hub unit having one race of the outer race and the inner race rotatable at the time of use and functioning as a hub securely connected to a wheel at the time of use, and the other race of the outer race and the inner race which does not rotate at the time of use and functioning as a stationary race supported by a suspension device.

In accordance with the seal ring of the present invention configured as described above, it is possible to simultaneously meet the contradictory requirements, i.e., decreasing the frictional resistance of the slidably contacting region between the seal lip and the counterpart surface and improving the durability of this seal lip, without compromising the sealing performance of this seal lip.

Namely, in the case of the seal lip constituting the seal ring according to the present invention, the deformation of this seal lip is concentrated to the most thin portion located in the vicinity of the base end portion to minimize the influence of the variation of the interference of this seal lip upon the contact pressure at the slidably contacting region between the tip edge portion of this seal lip and the counterpart surface. Accordingly, the variation of the contact pressure at the above slidably contacting region is narrowed irrespective of the tilt of the central axis of the hub during a turning motion or irrespective assembling errors, and therefore it is possible to secure a sufficient sealing performance and reduce the above frictional resistance without incurring an excessive contact pressure at the above slidably contacting region in its neutral position (the initial setting position). Also, the thickness of the seal lip is gradually decreased from the above most thick portion, which is located adjacent to this most thin portion, to the tip edge portion, and therefore when the tip edge portion of the above seal lip is abutted to the counterpart surface, the seal lip is elastically deformed also in the portion other than the above most thin portion. As a result, it is possible to improve the following performance of the leading edge of the seal lip responsive to the displacement of the counterpart surface in the axial direction without incurring an excessive elastic deformation of this most thin portion and improve the above durability by preventing the premature relaxation of this most thin portion.

More specifically explained, the following forces have been known as main causes of the contact pressure at the slidably contacting region between the seal lip called a side lip, which is urged against the slinger or the side surface of an attachment flange and compressed in the axial direction, and the counterpart surface.

① The bending force effective to increase the curvature of the cross section of the seal lip (decrease the curvature radius).

② The hoop force effective in the circumferential direction and generated when the diameter of the seal lip approximately in a conical form is elastically expanded to urge the seal lip against the counterpart surface.

Among these forces, the force ① largely varies when the distance between the seal lip and the counterpart surface varies, while the variation of the force ② is relatively small when the distance between the seal lip and the counterpart surface varies. Also, the generation of this forces ② is approximately uniform around the entire circumference.

Furthermore, the thicker the above seal lip and the greater the expansion of this seal lip in diameter, the larger the contact pressure applied to the slidably contacting region by the hoop force ② among these two types of force as ① and ②. On the other hand, in the case of the seal lip implemented in the prior art structure as described above, while the wall thickness is approximately uniform from the base end portion to the tip portion, the wall thickness of this base end portion inclusive of the curved portion (round portion) of the base end portion of this seal lip becomes larger to making it difficult to expand the diameter of this portion. Because of this, while an urging force is hardly generated by the above hoop force, the contact pressure at the above slidably contacting region is generated mainly on the basis of the above bending force ①.

In contrast to this, in the case of the seal ring according to the present invention, the most thin portion provided at the base end portion functions as a hinge to decrease the force to constrain on the most thick portion located in the leading edge side of this most thin portion in the radial direction and in the axial direction. Because of this, the above hoop force ② is easily generated. As a result, even if the central axis of the seal ring is tilted relative to the central axis of the member providing the counterpart surface with which the tip edge portion of the seal lip constituting this seal ring comes in slidable contact to make uneven the distance between the metal core constituting the above seal ring and the counterpart surface, the contact surface pressure between the tip edge portion of the above seal lip and the counterpart surface can be kept uniform. As a result of the uniform contact surface pressure at the slidably contacting region, it is possible to let this tip edge portion effectively follow the displacement of the counterpart surface without a particularly high surface pressure at the slidably contacting region between the tip edge portion of the seal lip and the counterpart surface. Then, as described above, it is possible to decrease the frictional resistance of the slidably contacting region between the seal lip and the counterpart surface and improve the durability of this seal lip, without compromising the sealing performance of this seal lip.

BEST MODE FOR CARRYING OUT THE INVENTION

Figure 1:
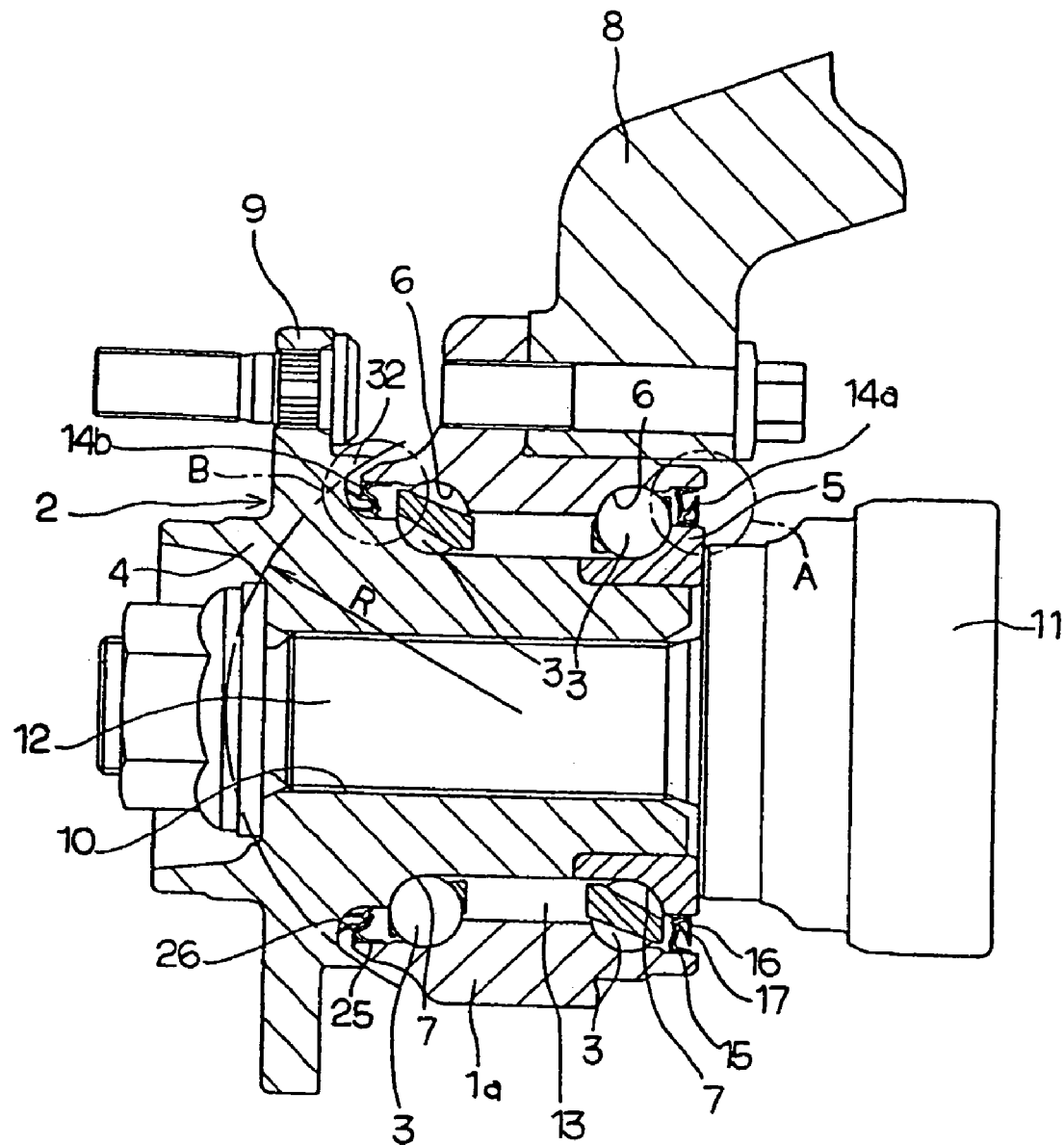
FIG. 1 is a cross sectional view of a rolling bearing unit with seal ring to show a first example of the embodiment of the present invention.
Figure 2:
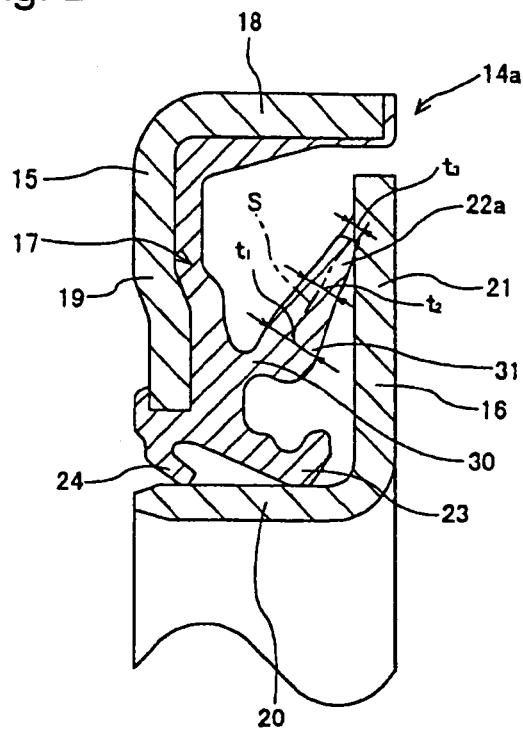
FIG. 2 is a partial, enlarged cross sectional view of a seal ring installed in Portion A of FIG. 1.

FIGS. 1 and 2 show a first example of the embodiment of the present invention. Incidentally, the characteristics of this example resides in that the sealing performance and the durability of a seal lip 22a are improved by devising the profile of the seal lip 22a constituting a seal ring 14a which serves to close the opening at the inner end of the internal space 13 with a plurality of rolling members 3, 3 provided therein. The structures and the functionality of the other elements are similar to those of the prior art structure as described above, and therefore, while redundant explanation is not repeated or is simplified with like symbols applied to like members, the following description is focused on the characteristic structure of the present invention differing from the above prior art structure.

The above seal lip 22a, which is called a side lip, is provided with a most thin portion 30 at the base end portion thereof by setting down the opposite surfaces of this base end portion toward the center in the thickness direction. Also, a most thick portion 31 having the largest thickness is provided adjacent to this most thin portion 30 in the side of the distal end of the above seal lip 22a. Furthermore, the thickness of the above seal lip 22a is gradually decreased from this most thick portion 31 to the tip edge portion in a convergent form. While a phantom line S is defined which passes the center in the thickness direction of the above seal lip 22a, the thickness $t_2$ of this seal lip 22a at the center position of this phantom line S from the above most thick portion 31 to the leading edge of the seal lip 22a is determined to be no smaller than 0.6 times and no larger than 0.9 times the thickness $t_1$ of the above most thick portion 31 ($0.6 \leq t_2/t_1 \leq 0.9$), preferably no smaller than 0.70 times and no larger than 0.85 times the thickness $t_1$ ($0.70 \leq t_2/t_1 \leq 0.85$). Also, the thickness $t_3$ of the tip edge portion is determined to be no smaller than 0.3 times and no larger than 0.7 times the thickness $t_1$ of this most thick portion 31 ($0.3 \leq t_3/t_1 \leq 0.7$), preferably no smaller than 0.35 times and no larger than 0.65 times the thickness $t_1$ ($0.35 \leq t_3/t_1 \leq 0.65$). The effects and advantages of the thicknesses at the respective positions as controlled in this manner will be explained in detail in the following description of the embodiment.

In the case of this example, while the metal core 15 of the seal ring 14a formed with the seal lip 22a shaped as described above is fitted and fixed into the inner end of the outer race 1a by interference fitting, the slinger 16 is fitted and fixed onto the inner end of the inner race element 5 by interference fitting. In this state, the tip edge of the above seal lip 22a is arranged to come in slidable contact with the outer surface of the inner circular ring portion 21 of the above slinger 16 around the entire circumference with an interference. In the case of this example, since the base end portion of the above seal lip 22a is formed with the most thin portion 30, the tip edge of this seal lip 22a can effectively follow the outer surface of the above inner circular ring portion 21. Because of this, it is possible, without compromising the sealing performance of the above seal lip 22a, to simultaneously meet the contradictory requirements of reducing the frictional resistance of the slidably contacting region between the tip edge of this seal lip 22a and the counterpart surface, i.e., the outer surface of the above inner circular ring portion 21, and improving the durability of the above seal lip 22a at the same time.

That is, in the case of this example, the deformation of the above seal lip 22a is concentrated in a degree to the most thin portion 30 located in the vicinity of the base end portion to minimize the influence of the variation of the interference of this seal lip 22a upon the contact pressure at the slidably contacting region between the tip edge portion of this seal lip 22a and the outer surface of the above inner circular ring portion 21. Also, even when the central axis of the above slinger 16 is tilted relative to the central axis of the above seal ring 14a, the portion of the above seal lip 22a from the most thick portion 31 to the tip edge portion can be smoothly moved through rocking motion corresponding to the tilt of the above slinger 16 by making use of the above most thin portion 30 as a hinge. Because of this, the tip edge portion of the above seal lip 22a can smoothly follow the outer surface of the above inner circular ring portion 21. Even in this state, a sufficient contact pressure can be applied to the slidably contacting region between the tip edge portion of the above seal lip 22a and the outer surface of the above inner circular ring portion 21 by the hoop force generated by expansion of the diameter of the leading portion of this seal lip 22a extending from the most thick portion 30 to the leading edge.

Accordingly, the variation of the contact pressure at the above slidably contacting region is narrowed irrespective of the tilt of the central axis of the hub 2 during a turning motion or of assembling errors, and therefore it is possible to secure a sufficient sealing performance and reduce the frictional resistance at the above slidably contacting region without incurring an excessive contact pressure at the above slidably contacting region in its neutral position (the initial setting position). Also, the thickness of the seal lip 22a is gradually decreased from the above most thick portion 31, which is located adjacent to this most thin portion 30, to the tip edge portion, and therefore when the tip edge portion of the above seal lip 22a is abutted to the counterpart surface, the seal lip 22a is elastically deformed also in the portion other than the above most thin portion 30, i.e., the above leading portion. As a result, it is possible to improve the durability of the above seal lip 22a by preventing an excessive elastic deformation of this most thin portion 30 and the premature relaxation of this most thin portion 30. Meanwhile, while the above most thin portion 30 is formed with a pair of hollow places set down in the opposite surfaces of the above seal lip 22a toward the center in the wall thickness direction in the case of the example as illustrated, a most thin portion can be formed by providing such a hollow place only in one of the opposite surfaces of the base end portion of the seal lip. Also, the profile of this hollow place is not limited to the profile as illustrated. Any profile can be employed as long as the deformation is concentrated to the base end portion of this seal lip 22a within the range in which the durability of the above seal lip 22a can be secured.

Also, in the case as shown in the figure, a ridge 32 is formed around the entire circumference on the intermediate portion of the inner surface of the attachment flange 9 formed on the outer peripheral surface of the hub body 4. The inner peripheral surface of this ridge 32 is a partial spherical concave surface having a curvature radius R with the center of displacement of the above hub body 4 during a turning motion being the center thereof, or a partial conical concave surface arranged partially touching such a spherical concave surface. Also, the outer peripheral surface of said outer race 1a located at the outer end portion to face the inner peripheral surface of the above ridge 32 is a partial spherical convex surface which is concentric with this inner peripheral surface and has a curvature radius slightly smaller than the above curvature radius R, or a partial conical convex surface arranged partially touching such a spherical convex surface.

This partial spherical convex surface or partial conical convex surface is located opposed to the above partial spherical concave surface or partial conical concave surface, and a labyrinth seal is provided in the facing location. The gap at this labyrinth seal does not vary and is constant or substantially constant even when the central axis of the above hub body 4 is tilted during a turning motion. Because of this, a sufficient labyrinth sealing performance can be always obtained by decreasing the above gap. By providing such a labyrinth seal, it is possible to secure a necessary sealing performance even if decreasing, to some extent, the contact pressure at the slidably contacting region between the tip edge portion of the seal lip of the seal ring 14b closing the opening of said internal space 13 at the outer end and the counterpart surface. Because of this, it is possible to reduce the seal torque of the above seal ring 14b.

Figure 3:
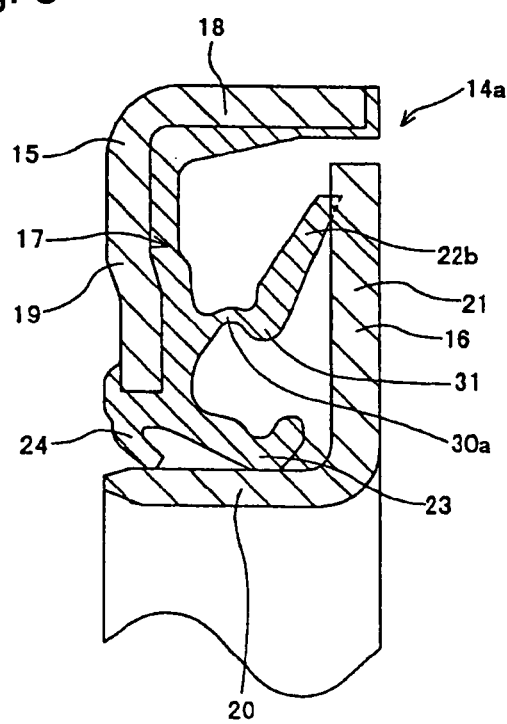
FIG. 3 is a view similar to FIG. 2 to show a second example of the embodiment of the present invention.

Next, FIG. 3 shows a second example of the embodiment of the present invention. In the case of this example, the most thin portion 30a formed of the base end portion of a seal lip 22b, called a side lip, provided in the most radially outer side of the sealing member 17 constituting the seal ring 14a is warped as viewed in its cross section. Also, this most thin portion 30a is formed approximately in the axial direction of the above seal ring 14a. In the case of this example with such a most thin portion 30a, the deformation of this most thin portion 30a becomes easy in the axial direction, and therefore, even if the interference varies, the sliding contact position between the tip edge portion of the above seal lip 22b and the counterpart surface little varies in the radial direction so that the sliding contact position falls within a certain range. The structures and the functionality of the other elements are similar to those of the first example as described above.

Figure 4:
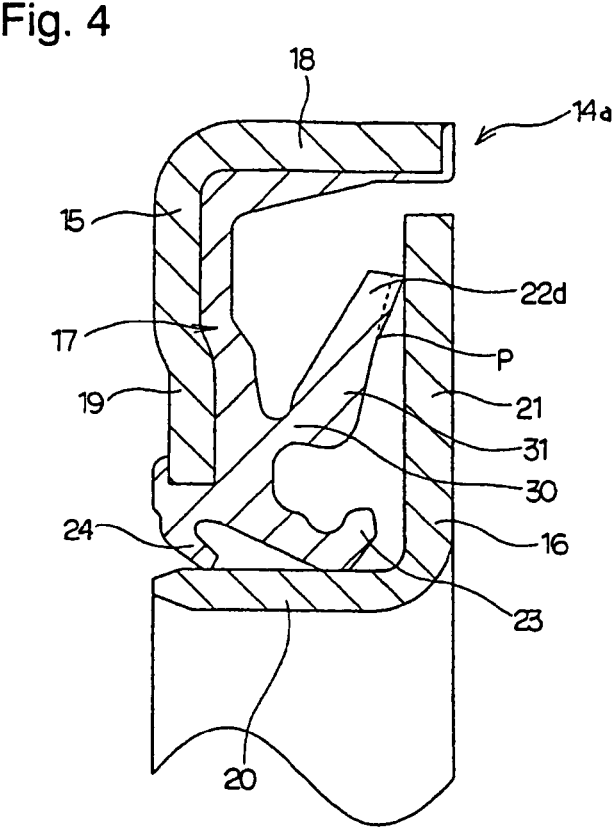
FIG. 4 is a view similar to FIG. 2 to show a third example of the embodiment of the present invention.
Figure 5:
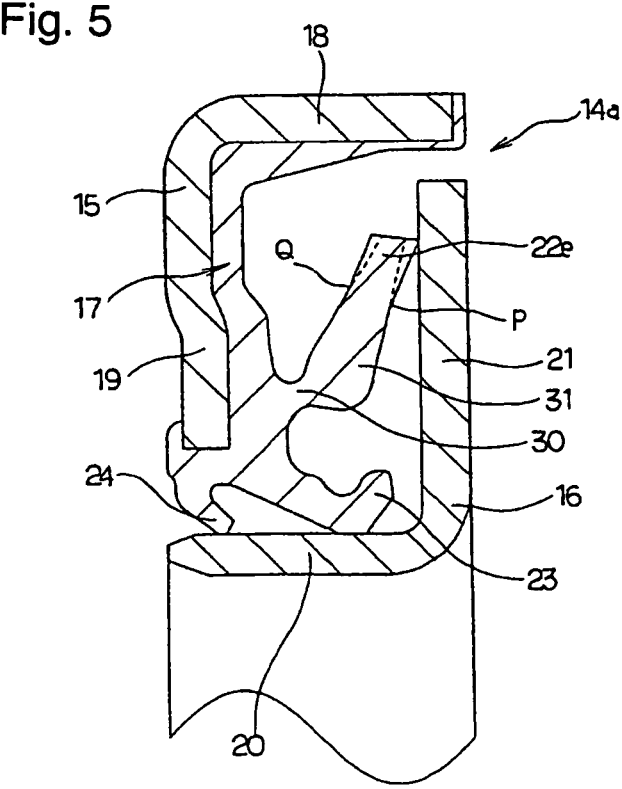
FIG. 5 is a view similar to FIG. 2 to show a fourth example of the embodiment of the present invention.

Next, FIGS. 4 and 5 show a third and a fourth example of the embodiment of the present invention. In the case of this example, seal lips 22d and 22e, each called a side lip, are provided respectively with a most thin portion 30 at the base end portion thereof by setting down the opposite surfaces of this base end portion toward the center in the thickness direction. Also, a most thick portion 31 having the largest thickness is provided adjacent to this most thin portion 30 in the side of the distal end of the above seal lips 22d and 22e. Furthermore, also in the above third and fourth examples, the thicknesses of the above seal lips 22d and 22e are gradually decreased from this most thick portion 31 to the tip edge portion in the same manner as the above first and second examples.

Particularly, in the above third and fourth examples, by devising the profiles of the intermediate portions of the above seal lips 22d and 22e closer to the leading edges, the thickness dimensions of the tip portions of these seal lips 22d and 22e are prevented from being excessively small and can be secured even with abrasion. That is, in the case of the third example as illustrated in FIG. 4, the thickness dimension of the seal lip 22d is little diminished or rather becomes larger in the portion of the above seal lip 22d that is located in the radially inner side in its free state among the opposite side surfaces of the above seal lip 22d and is extending to the distal end beyond a point P displaced from the center toward the distal end in the surface opposite to the inner circular ring portion 21 constituting the slinger 16 in its use condition. On the other hand, in the case of the fourth example as illustrated in FIG. 5, the rate of diminishing the thickness dimension of the seal lip 22e becomes smaller toward the distal end from a point P similar as that of the above third example and from a point Q located in the opposite surface of the seal lip 22e approximately opposite the point P. Even if the thickness is increased near the tip edge portion, the thickness is gradually decreased to the above points P and Q and therefore the elastic deformation of the above respective seal lips 22d and 22e can be sufficiently secured. Meanwhile, the chained line plotted in the seal lips 22d and 22e shown in FIGS. 4 to 5 shows the design of the cross section illustrated on the assumption that the thickness dimension is decreased, as it is, beyond the points P and Q toward the leading edge. It is for the following reason that the rate of diminishing the thickness dimension $t_3$ (refer to FIG. 2) of the tip edge portion of the seal lips 22d and 22e is decreased or that the thickness dimension is increased.

It is considered as the cause of the degradation of the sealing performance of the above seal lips 22d and 22e that foreign objects enter the slidably contacting region between the inner circular ring portion 21 constituting the slinger 16 and the surface of the tip edge of this seal lips 22d or 22e that is located in the radially inner side in its free state to cause the abrasion of the side surface of this inner circular ring portion 21 and the tip edge of this seal lips 22d or 22e and decrease the pressing force of these seal lips 22d and 22e. In the case of the third example as illustrated in FIG. 4, since the thicknesses of the tip portions of the seal lips 22d and 22e are large, the decrease in the pressing force and the relaxation of these seal lips 22d and 22e can be inhibited even if foreign objects enter the slidably contacting region between the tip edge portions of these seal lips 22d and 22e and the side surface of the above inner circular ring portion 21 to cause the abrasion of the side surface of the tip edge portions of these seal lips 22d and 22e and the side surface of the above inner circular ring portion 21. Also, in the case of the fourth example as illustrated in FIG. 5, since the tip edge portion is made furthermore thicker than that of the above third example, it is possible to more sufficiently inhibits the decrease in the pressing force and the relaxation even the abrasion is caused as described above.

Furthermore, since the thicknesses of the above seal lips 22d and 22e are gradually thinned toward the point in the vicinity of the leading edges of the seal lips 22d and 22e, it is possible to attenuate the strain applied to the tip portions of the above seal lips 22d and 22e in the assembled condition. Furthermore, since this seal lips 22d and 22e are provided with the most thin portion 30 as diminished at the base end portion, it is possible to improve the following performance of the tip edge portion of the above seal lips 22d and 22e responsive to the movement of the side surface of the above inner circular ring portion 21 to maintain approximately constant the above pressing force in the long term use. That is, also in the case of these examples, it is possible to lower the strain generated in the seal lips 22d and 22e and let the tip edge portions of the above seal lips 22d and 22e satisfactorily follow the displacement of the side surface of the above inner circular ring portion 21 by virtue of the existence of the above most thin portion 30. Because of this, it is possible to maintain approximately constant the pressing force of the seal lips 22d and 22e for a long time and to improve the sealing performance. Also, even when the central axis of the inner race element 5 is tilted relative to the central axis of the outer race 1a (refer to FIG. 1), the above seal lips 22d and 22e fixed to this outer race 1a can satisfactorily follow the movement of the inner circular ring portion 21 of said slinger 16 fixed to the above inner race element 5 to maintain the sealing performance in a satisfactory condition.

Figure 6:
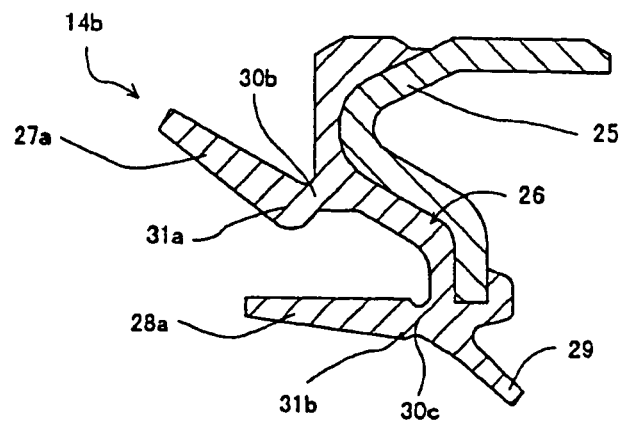
FIG. 6 is a partial, enlarged cross sectional view of a seal ring installed in Portion B of FIG. 1 to show a fifth example of the embodiment of the present invention.

Next, FIG. 6 shows a fifth example of the embodiment of the present invention. This example shows the seal ring 14b, to which the present invention is applied, for closing the outer end portion of the internal space 13 (refer to FIG. 1) of the rolling bearing unit. For this purpose, in the case of this example, most thin portions 30b and 30c are formed respectively on the base end portion of the seal lip 27a, which is located in the most outer location among the three seal lips 27a, 28a and 29 constituting this seal ring 14b to outwardly project in the axial direction, and the base end portion of the seal lip 28a, which is located in an intermediate location thereamong. Then, there are provided most thick portions 31a and 31b respectively in the locations of the respective seal lips 27a and 28a adjacent to the respective most thin portions 30*b* and 30*c* in the side of the leading edges of the respective seal lips 27*a* and 28*a* Also in the case of this example, it is preferred to restrict the wall thickness of the above respective seal lips 27*a* and 28*a* from the most thick portions 31*a* and 31*b* to the tip edge portion. Incidentally, while the present invention is applied to both the two seal lips 27*a* and 28*a* in the case of this example, corresponding advantages can be achieved by applying the present invention to at least one seal lip.

Figure 7:
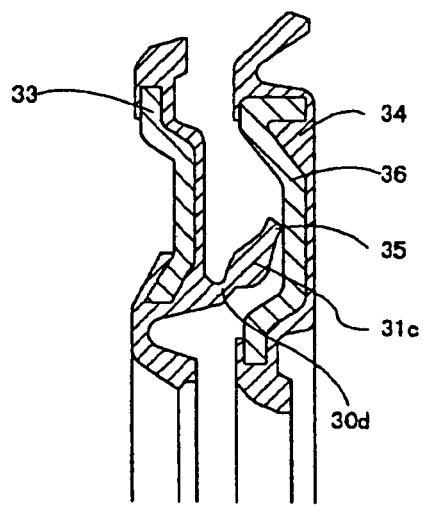
FIG. 7 is a partial, enlarged cross sectional view of a seal ring to show a sixth example of the embodiment of the present invention.

Next, FIG. 7 shows a sixth example of the embodiment of the present invention. In the case of this example, the tip edge portion of the seal lip 35 laterally extending (toward the right in FIG. 7) from a seal ring 33 of one (the left one in FIG. 7) of a pair of the seal rings 33 and 34 adjacent to each other in the axial direction is arranged to come in slidable contact with the side surface of the metal core 36 constituting the other seal ring 34 (the right one in FIG. 7) around the entire circumference. The seal ring 33, as one of the above pair of seal rings 33 and 34, is locked to the inner peripheral surface of the outer race at its outer peripheral edge portion and comes in slidable contact with the outer peripheral surface of the inner race at its inner peripheral edge portion around the entire circumference. In contrast to this, the other seal ring 34 is locked to the outer peripheral surface of the inner race at its inner peripheral edge portion and comes in slidable contact with the inner peripheral surface of the outer race at its peripheral edge around the entire circumference. In the case of this example having such a basic structure, the above seal lip 35 is formed with the most thin portion 30*d* at its base end portion thereof and the most thick portion 31*c* in an adjacent location. The tip edge portion of the above seal lip 35 is thereby arranged to suitably come in slidable contact with the side surface of the above metal core 36 even when the central axis of the above outer race and the central axis of the above inner race are misaligned with each other due to a moment load and the like. Also, the contact surface pressure between the tip edge portion of the above seal lip 35 and the side surface of the above metal core 36 little varies by the variation of the interference due to the assembling errors of the inner and outer races and the like.

Figure 8:
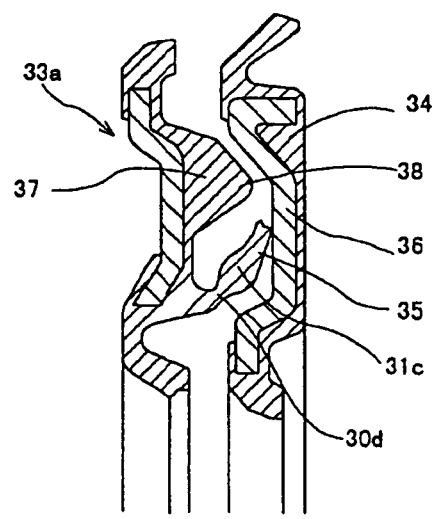
FIG. 8 is a partial, enlarged cross sectional view of a seal ring to show a seventh example of the embodiment of the present invention.

Next, FIG. 8 shows a seventh example of the embodiment of the present invention. In the case of this example, the sealing member 37 constituting the seal ring 33*a* in one side is formed with a convex portion 38 in an location outside of the seal lip 35 in the radial direction around the entire circumference. A labyrinth seal is therefore formed in that location by locating the tip surface of this convex portion 38 close and opposed to the side surface of the metal core 36 constituting the other seal ring 34. The tip surface of the above convex portion 38 and the side surface of the metal core 36 located to be close and opposed to each other are designed respectively as a partial spherical surface having, as the center, the center of displacement caused by a moment load or a partial conical surface arranged partially touching such a spherical surface in order that the gap at the above labyrinth seal does not vary irrespective of the displacement. In the case of this example, by providing this labyrinth seal, it is possible to maintain low the surface pressure in the slidably contacting region between the tip edge portion of the seal lip 35 and the side surface of the metal core 36, while securing a necessary sealing performance, and therefore lower the torque applied to the rolling bearing unit with seal ring.

Figure 9:
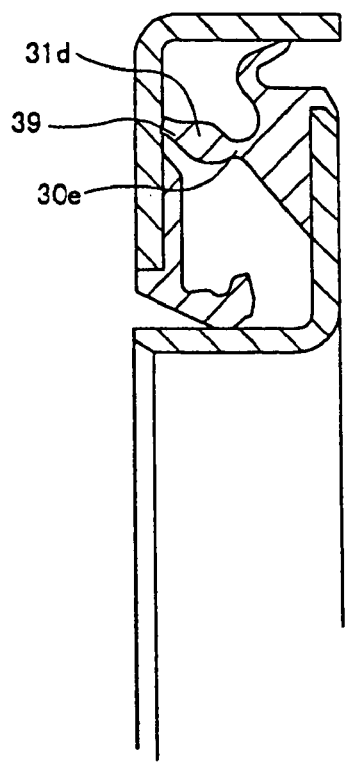
FIG. 9 is a partial, enlarged cross sectional view of a seal ring to show an eighth example of the embodiment of the present invention.

Next, FIG. 9 shows an eighth example of the embodiment of the present invention. In the case of this example, the present invention is applied to a combination seal ring comprising seal rings each of which is composed of a metal core and a sealing member. For this purpose, a seal lip 39 laterally extending to come in slidable contact with the side surface of the metal core constituting the counterpart seal ring is provided with a most thin portion 30*e* and a most thick portion 31*d* located adjacent to each other as viewed from the base end side.

Figure 10:
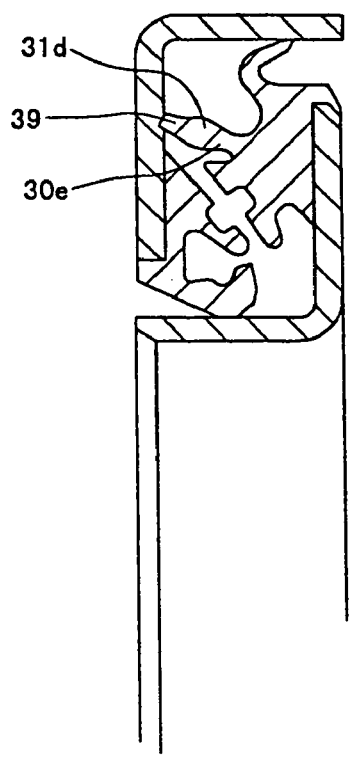
FIG. 10 is a partial, enlarged cross sectional view of a seal ring to show a ninth example of the embodiment of the present invention.
Figure 11:
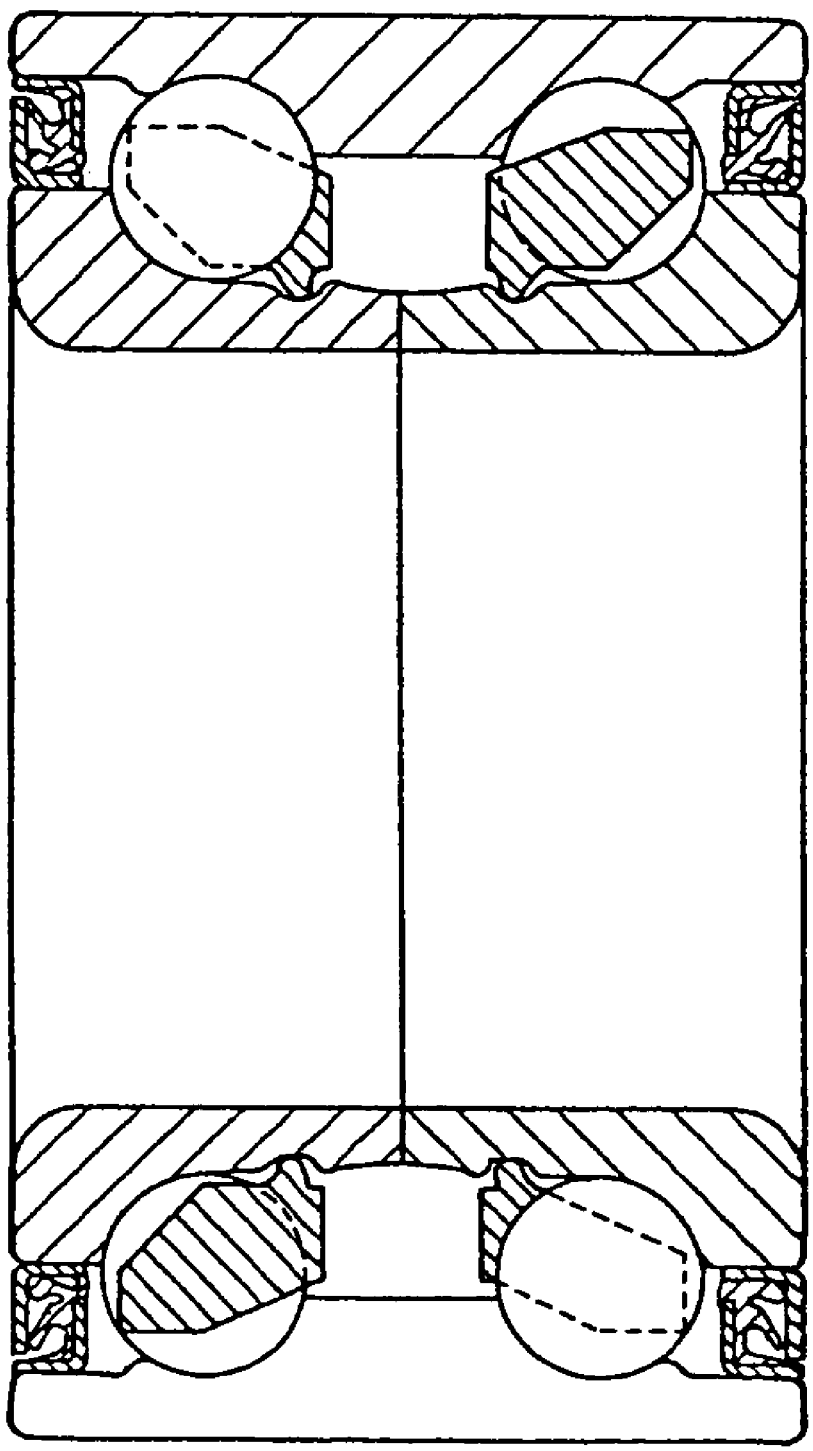
FIG. 11 is a cross sectional view to show a second example of the rolling bearing unit with seal ring for the present invention.

Next, FIG. 10 shows a ninth example of the embodiment of the present invention. In the case of this example, a pair of seal rings are located to have sealing members partially opposed to each other in order to form a labyrinth seal in that location. The opposite surfaces of the pair of sealing members, which are located to be close and opposed to each other, are designed respectively as a partial spherical surface having, as the center, the center of displacement caused by a moment load or a partial conical surface arranged partially touching such a spherical surface in order that the gap at the above labyrinth seal does not vary irrespective of the displacement. The structures of the other elements are similar to those of the eighth example as described above.

Incidentally, in the above respective examples, the most thin portion can be formed by providing a pair of hollow places set down in the opposite surfaces of the seal lip toward the center in the wall thickness direction, or by providing such a hollow place only in any one of the opposite surfaces of the base end portion of the seal lip. An appropriate profile other than that as illustrated in the figure can be employed as the profile of the hollow place in the same manner as the above first example. Also, the direction of the seal lip (for example, the seal lip 24 shown in FIG. 2) closest to the internal space 13 (refer to FIG. 1) is arbitrary. However, as illustrated in FIG. 2, when the seal lip is tilted to depart from the above internal space 13 toward the tip edge portion, the grease placed in the above internal space 13 tends to be supplied little by little to the slidably contacting region between the tip edge portion of the other seal lip and the counterpart surface Because of this, it is possible to improve the abrasion proof structure and the low torque structure of the respective seal lips by reducing the friction at the respective slidably contacting regions. Furthermore, it is possible to effectively reduce the seal torque, while maintaining a necessary sealing performance, by setting, to zero, the interference of the seal lip (grease lip) located closest to the internal space 13 and reducing the contact pressure between the tip edge portion of this seal lips and the corresponding surface. Also, from the view point of obtaining the advantages of the present invention, the type of the rubber material used to form the sealing member is arbitrary. For example, a conductive rubber material can be used for inhibiting radio noise by lessening the discharge from a rolling bearing unit with seal ring.

Figure 12:
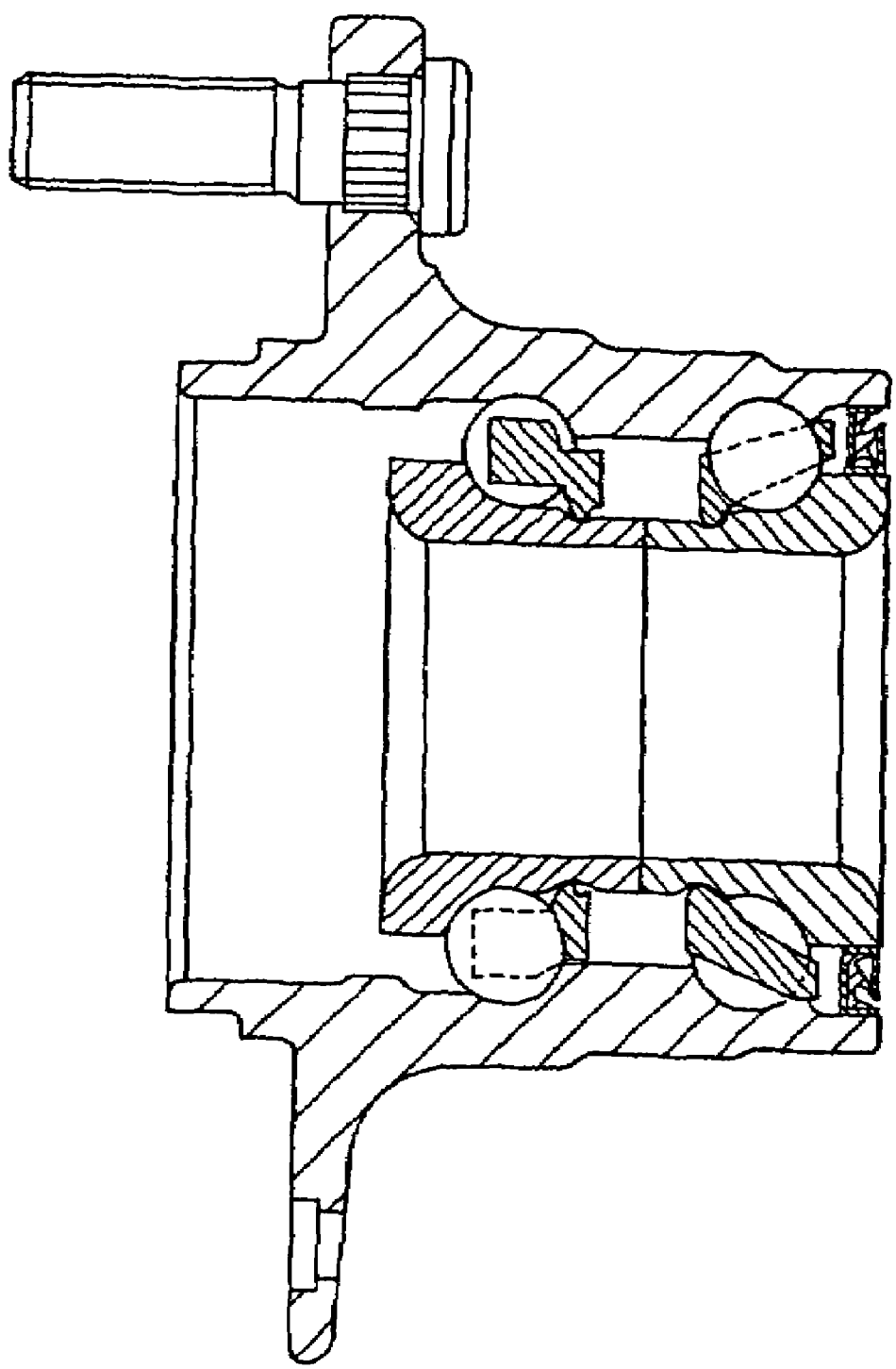
FIG. 12 is a cross sectional view to show a third example of the rolling bearing unit with seal ring for the present invention.
Figure 13:
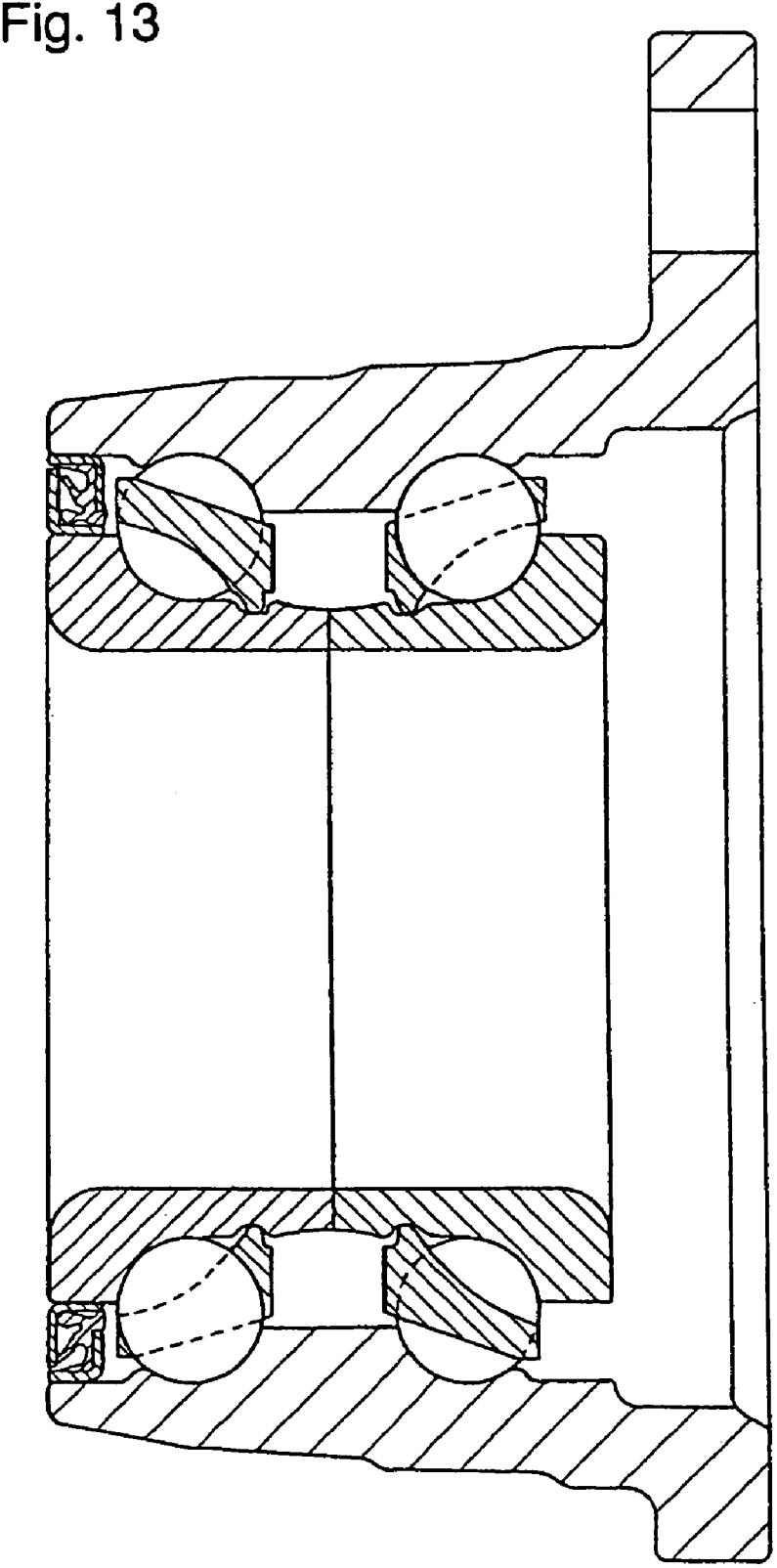
FIG. 13 is a cross sectional view to show a fourth example of the rolling bearing unit with seal ring for the present invention.
Figure 14:
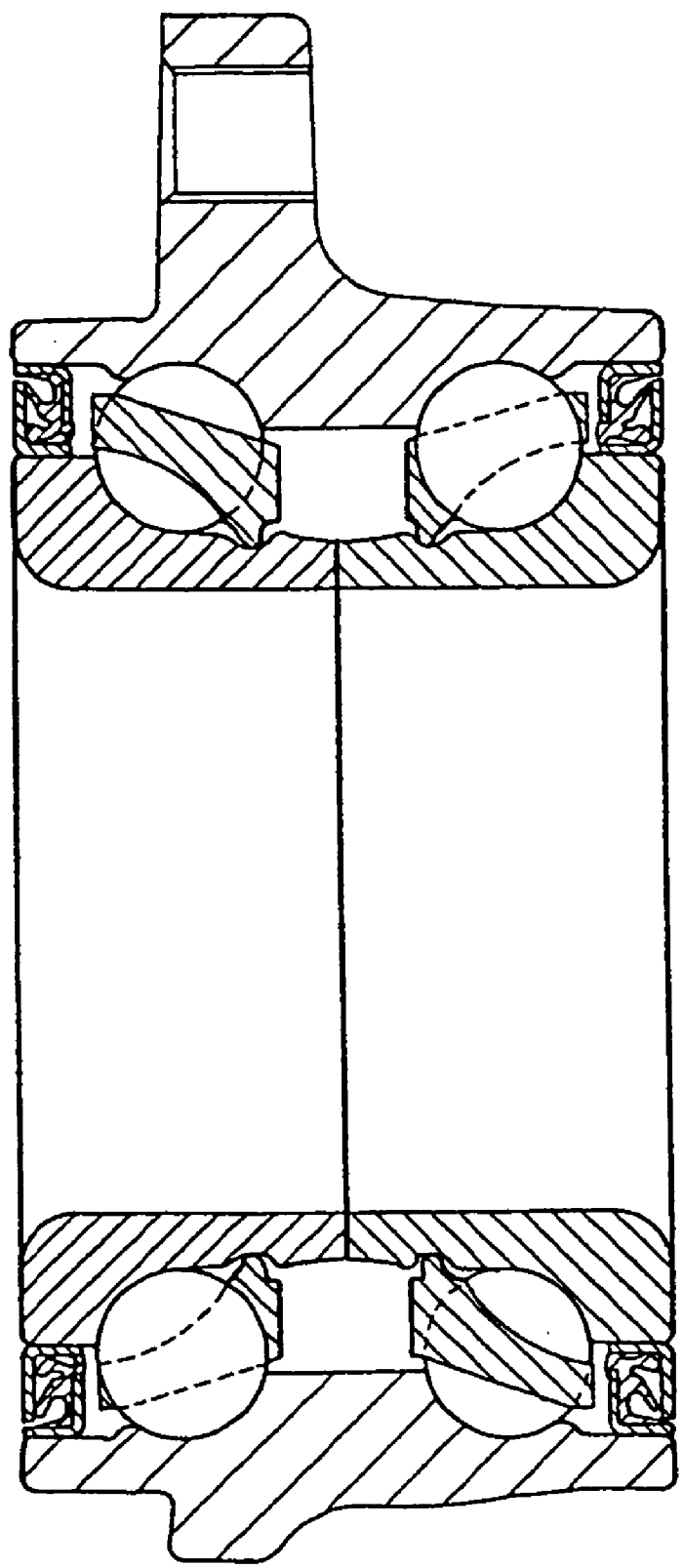
FIG. 14 is a cross sectional view to show a fifth example of the rolling bearing unit with seal ring for the present invention.
Figure 15:
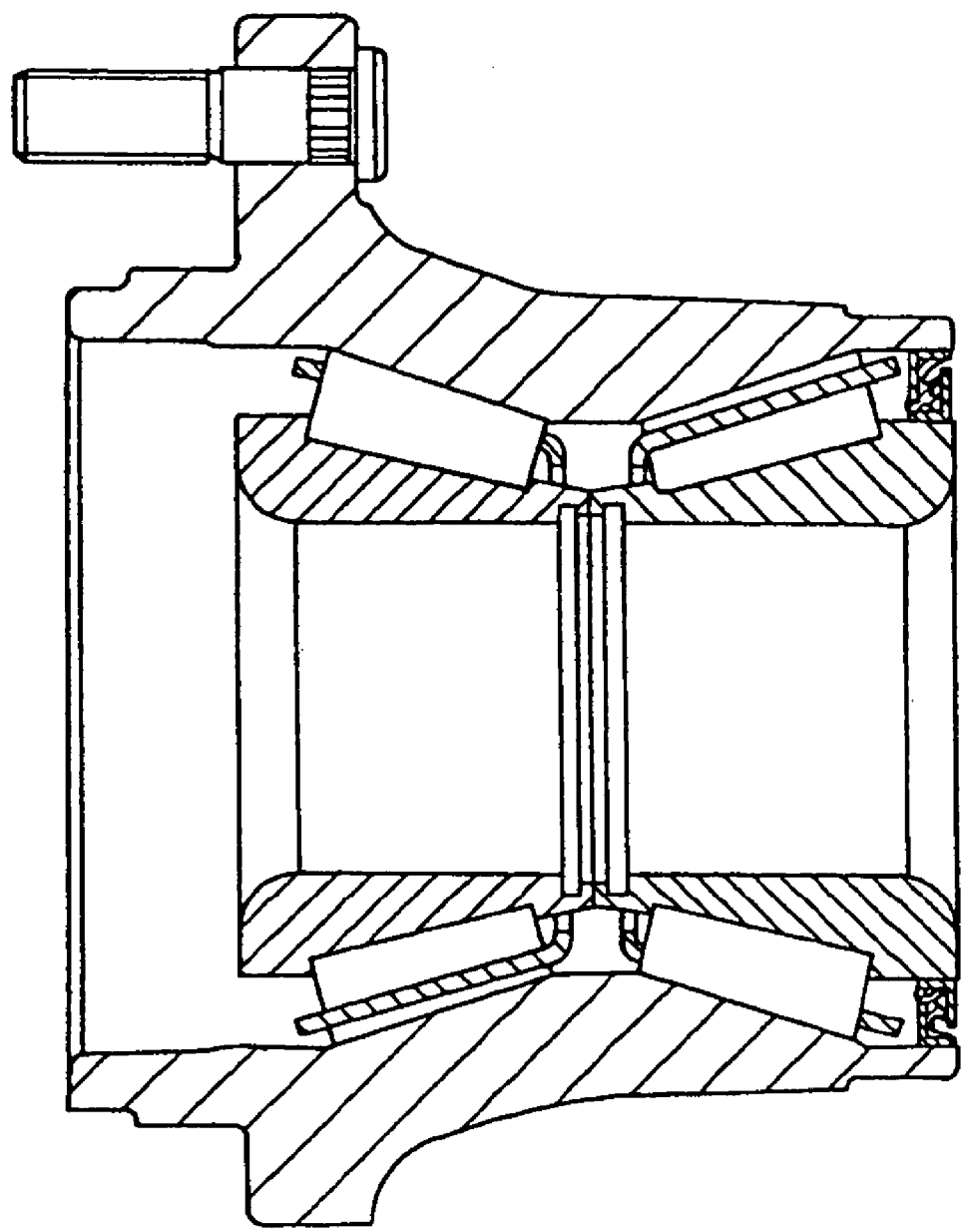
FIG. 15 is a cross sectional view to show a sixth example of the rolling bearing unit with seal ring for the present invention.

Also, while the basic structure of the rolling bearing unit with seal ring is not limited to the application to the structure for rotating an inner race as illustrated in FIG. 1, it is applicable also to the structure for rotating an outer race. Furthermore, the present invention is not limited to the so called third generation hub unit as illustrated in FIG. 1 in which the inner raceway 7 is formed directly on the hub body 4, but applicable also to the so called first generation hub unit, and the second generation hub unit as illustrated in FIG. 12 to FIG. 14. Furthermore, the present invention is not limited to the structure implemented with balls as rolling members, but applicable also to the hub unit implemented with taper rollers as rolling members as illustrated in FIG. 15. Needless to say, the present invention is applicable also to the first or third generation hub unit in which the rolling members are changed from balls to taper rollers. Furthermore, the present invention is applicable also to rolling bearing units with seal ring other than for use in a vehicle to obtain the effects and advantages as described above, as long as the sealing performance is affected by the variation of the interference of the seal lip due to the influence of the moment load applied during a turning motion or because of assembling errors.

Figure 16:
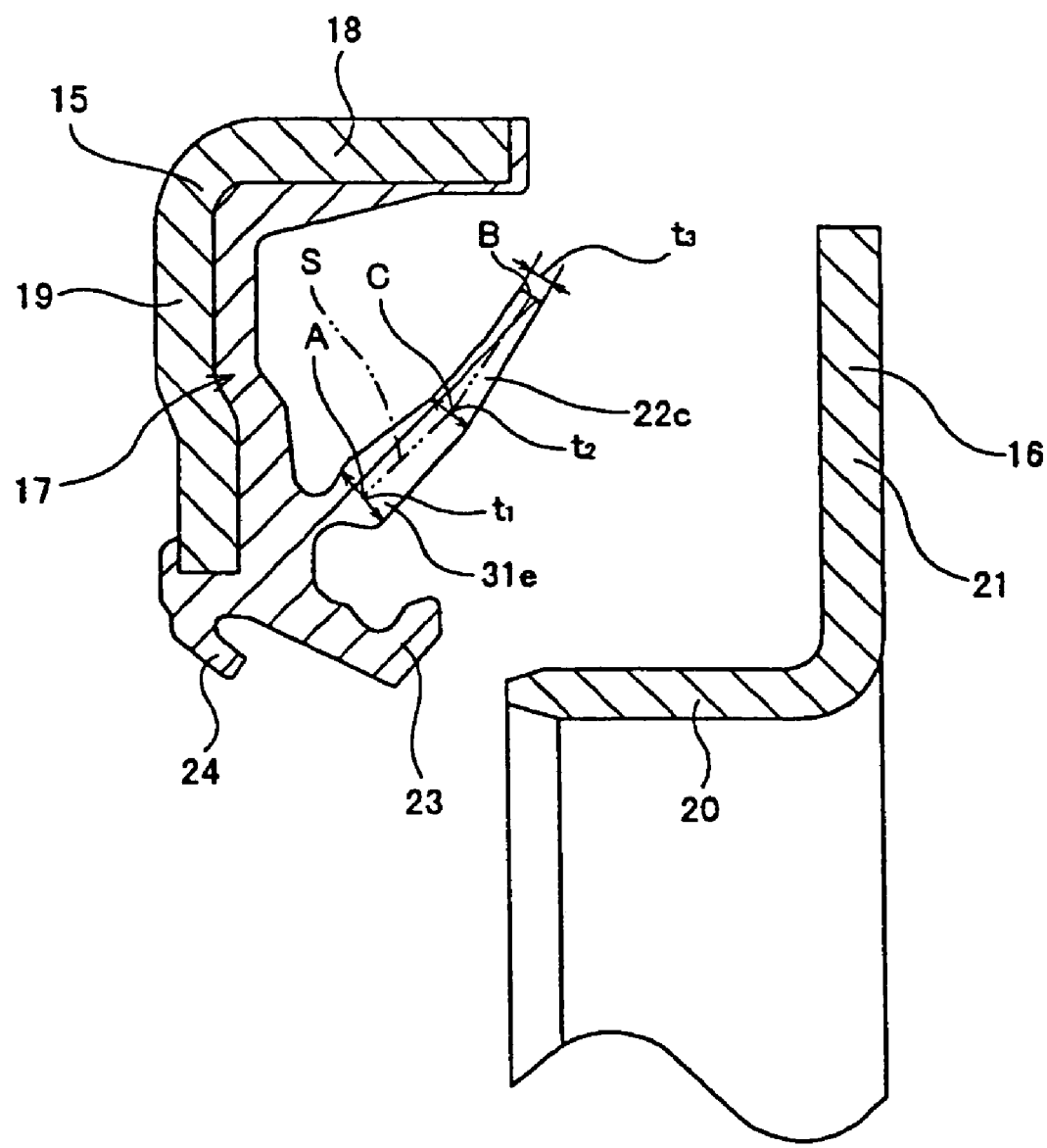
FIG. 16 is a partial, enlarged cross sectional view to show a combination seal ring for a simulation for confirming the effects of the present invention in an exploded condition.

Practical Example:

Next, a simulation conducted for confirming the advantages of the present invention will be explained. FIG. 16 shows a combination seal ring used in this simulation with a metal core 15 and a slinger 16 being sufficiently apart from each other to have a sealing member 17 in its free state. A phantom line segment "S" is defined which passes the center in the thickness direction throughout the entire length of the cross section of a seal lip 22c formed on this sealing member 17. Meanwhile, the form of this phantom line S is determined in accordance with the profile of this seal lip 22c and may be a straight line, a kinked line, a curved line or any other line. Anyway, it is assumed that, on the above phantom line S, a point A is the point corresponding to the most thick portion 3 1e, a point B the point corresponding to the tip edge portion of the above seal lip 22c, and a point C the point corresponding to the midpoint between the point A and the point B. Also, it is assumed that the wall thickness of the above seal lip 22c is $t_1$ at the point A, $t_2$ at the point C and $t_3$ at the point B.

Figure 17:
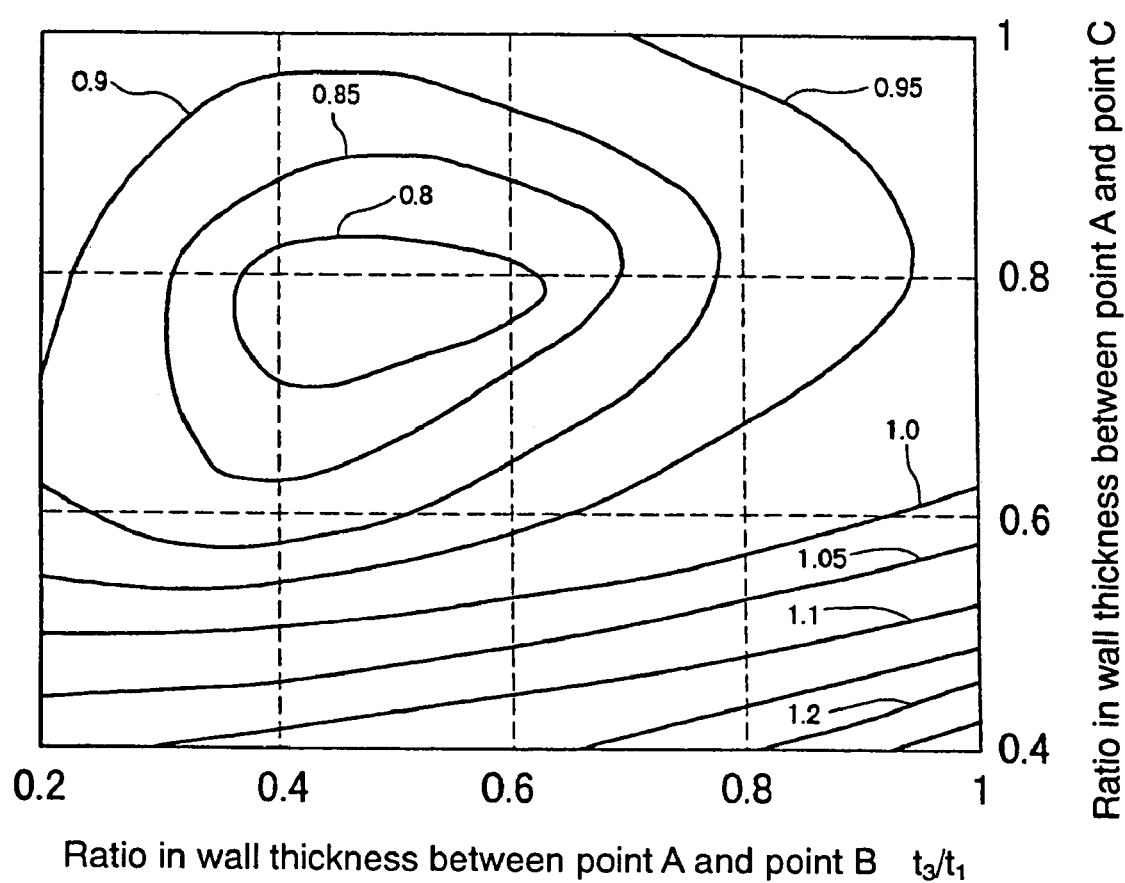
FIG. 17 is a graph to show a result that the effect that the material thickness from the most thick wall thickness portion to the tip end portion influences the size of the maximum strain generated in this seal lip was obtained in accordance with the finite element method.
Figure 18:
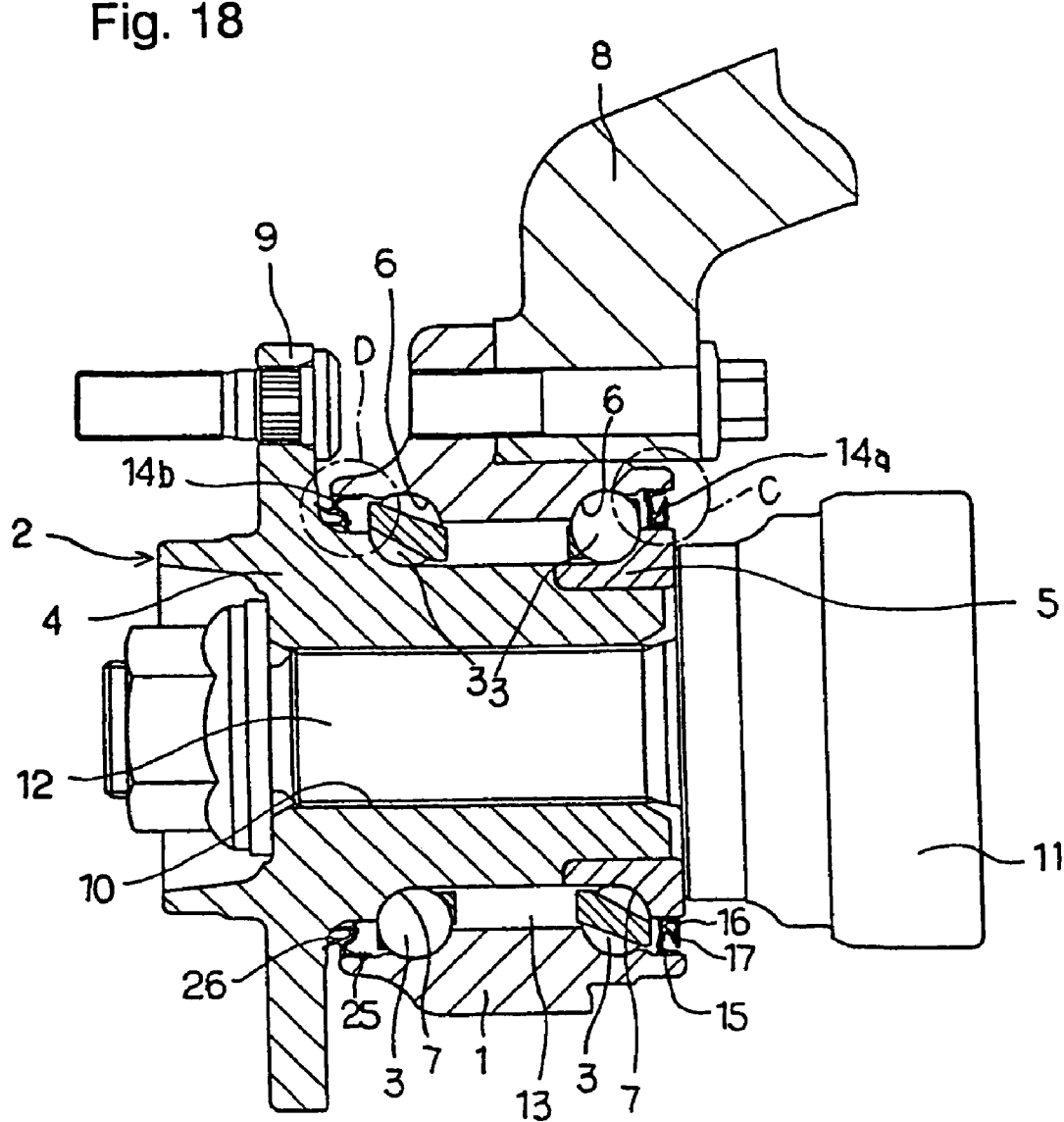
FIG. 18 is a cross sectional view of a rolling bearing unit with seal ring to show a first example of the conventional structure.
Figure 19:
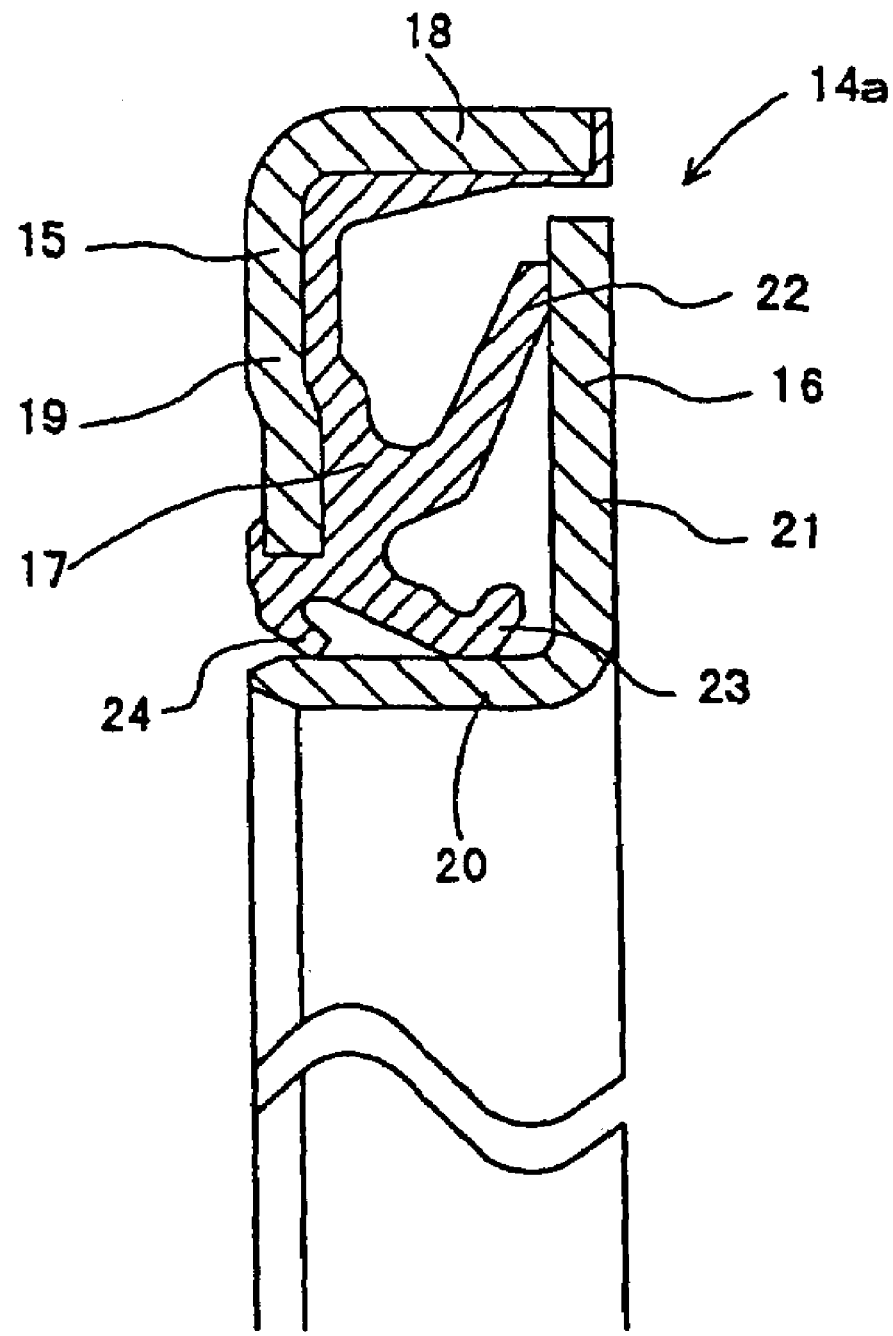
FIG. 19 is a partial, enlarged cross sectional view of a seal ring installed in Portion C of FIG. 18.
Figure 20:
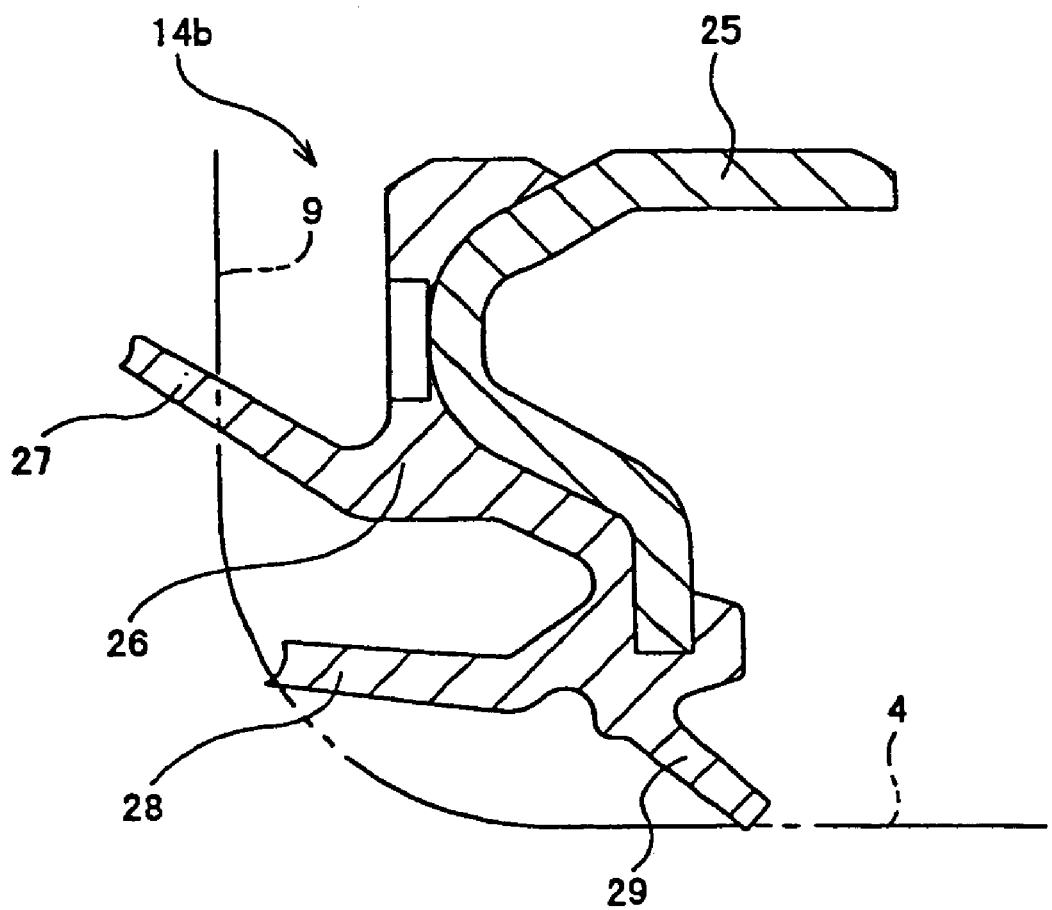
FIG. 20 is a partial, enlarged cross sectional view of a seal ring installed in Portion D of FIG. 18.
Figure 21:
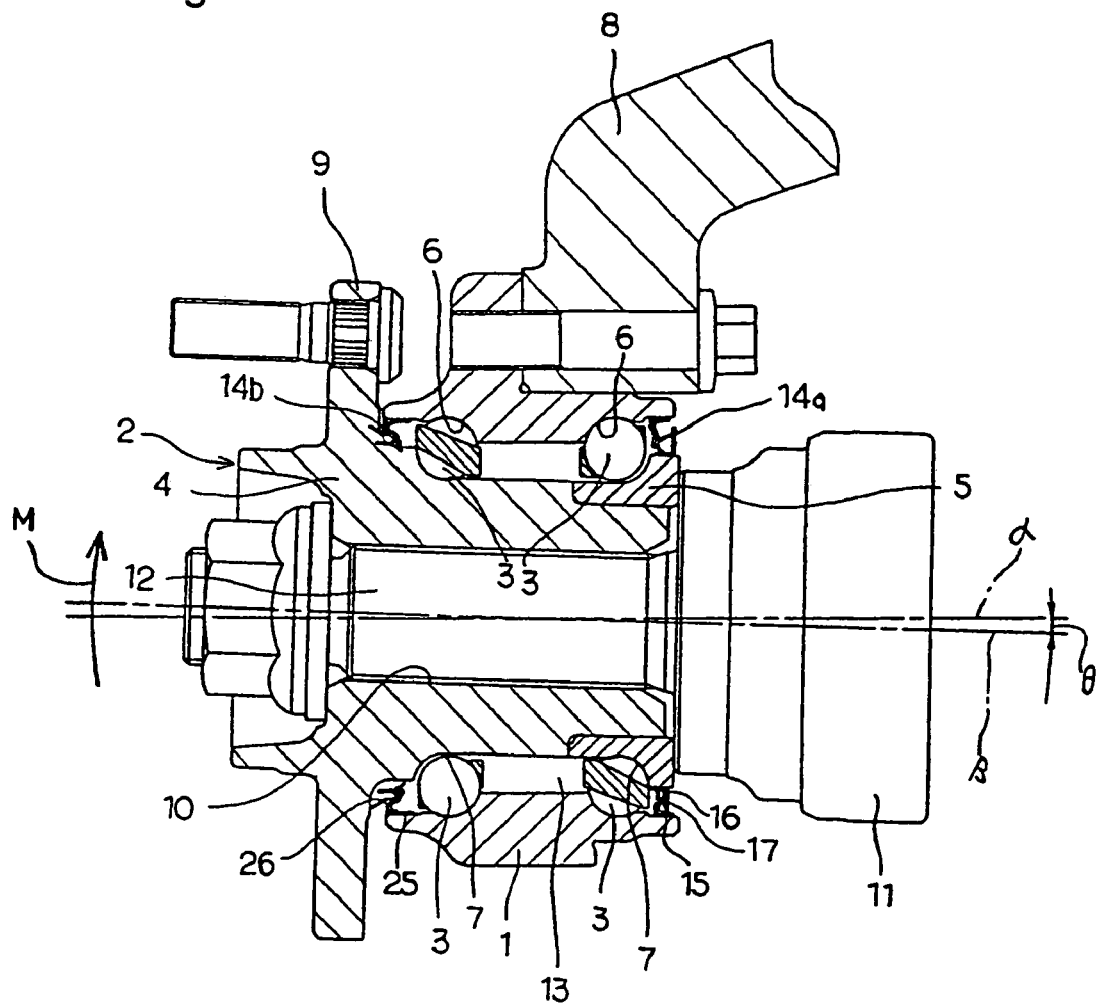
FIG. 21 is a cross sectional view of rolling bearing unit with seal ring to show a condition that a hub is tilted by a moment load that is applied when the vehicle is moving.
Figure 22:
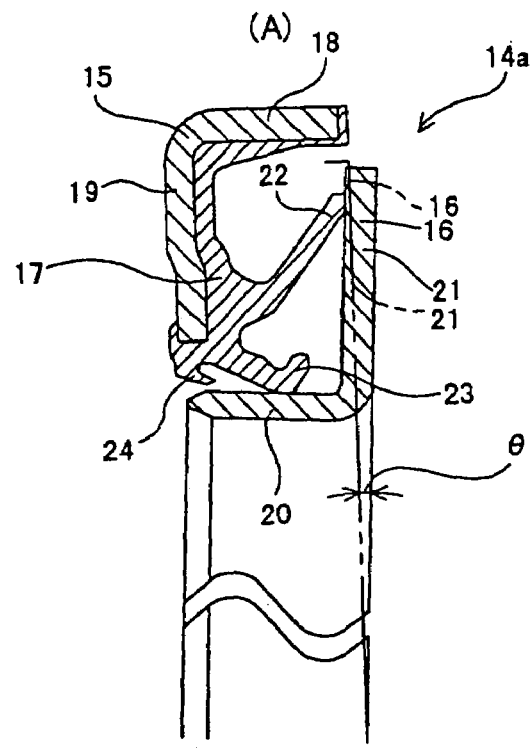
FIG. 22 is a partial, enlarged cross sectional view to show a condition that a slinger of the seal ring installed in the rolling bearing unit with seal ring in FIG. 21 is displaced.
Figure 22:
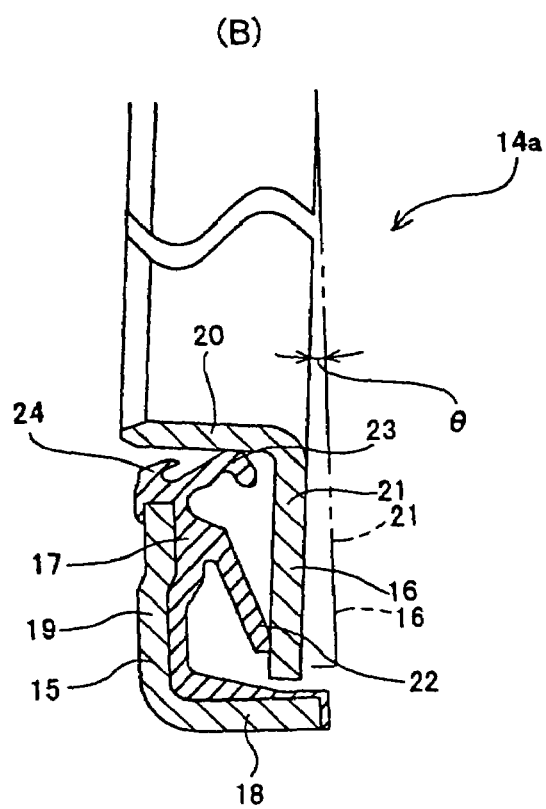

In this assumption, the maximum strain generated from the above most thick portion 3 1e to the tip edge portion of the above seal lip 22c was obtained with the varying wall thicknesses $t_1$, $t_2$ and $t_3$ of the above respective points in accordance with the finite element method. FIG. 17 shows the result thereof. This FIG. 17 shows the ratio in wall thicknesses between the above point A and the above point B ($t_2/t_1$) in the ordinate and the ratio in wall thicknesses between the above point A and the above point C ($t_3/t_1$) in the abscissa respectively. Incidentally, the respective curves as illustrated in FIG. 17 indicate contour lines each of which connects points of the equal ratio of the maximum strain generated in the above seal lip 22c from the above most thick portion 31e to the tip edge portion. Meanwhile, this ratio of the maximum strain was calculated in relation to the maximum strain generated in the side lip which was designed to have the equal wall thickness at the above three points (i.e., calculated as the ratio of the maximum strain with this maximum strain being as 1).

Also, the analysis condition is as follows.

(1) Size of the combination seal ring: the inner diameter=60 mm, the outer diameter=80 mm, and the assembled width=4 mm.

(2) Interference of the seal lip 22c: 0.8 mm.

(3) Contact pressure between the slinger 16 and the seal lip 22c: constant.

As apparent from FIG. 17 illustrating the ratios of the maximum strain obtained in these conditions, if it is satisfied with the relations between the wall thickness $t_1$ $t_2$ and $t_3$ of these points that $0.6 \leq t_2/t_1 \leq 0.9$ and $0.3 \leq t_3/t_1 \leq 0.7$, preferably $0.70 \leq t_2/t_1 \leq 0.85$ and $0.35 \leq t_3/t_1 \leq 0.65$, it is understood that the durability of the seal ring inclusive of this seal lip 22c can be improved by maintaining low the maximum strain generated in the above seal lip 22c and preventing the relaxation and damage such as cracks of this seal lip 22c. Incidentally, the above optimal range in accordance with the result of this simulation is applicable to all the seal rings as targets of the present invention inclusive of the respective examples of the embodiments as described above.

INDUSTRIAL APPLICABILITY

Since the seal ring and the rolling bearing unit with seal ring in accordance with the present invention are constructed and operated as mentioned above, it is possible to optimize the surface pressure at the slidably contacting region between the tip edge portion of the seal lip that is located closest to the outer space and the mating surface, the seal lip being most important for preventing the entrance of foreign objects irrespective of the displacement of the respective elements during operation or because of assembling errors. Also, the seal lip can follow the displacement of the counterpart surface. It is therefore possible to reduce the friction of the above seal lip and improve the durability of this seal lip. Because of this, when the seal lip is applied for example to a rolling bearing unit with seal ring for supporting the wheels of a vehicle, it is possible to improve the traveling performance of the above vehicle represented by fuel consumption performance and acceleration performance, and the durability of the above rolling bearing unit with seal ring.

The invention claimed is:

1. A seal ring comprising:
   a first seal lip having a tip edge in sliding contact with a circular ring surface of a rotating member, and
   a second seal lip located adjacent to and internally to the first seal lip, the second seal lip having a tip edge in sliding contact with a peripheral surface of the rotating member, the tip edge thereof being directed in the same axial direction as the tip edge of the first seal lip,
   wherein the first seal lip is formed with a portion having a smallest thickness in the vicinity of the base end portion thereof.

2. A seal ring according to claim 1, wherein the first seal lip is formed with a portion having a largest thickness adjacent to the smallest thickness portion on the side of the tip edge, the thickness of the first seal is gradually decreased from the largest thickness portion to the tip edge, and the ratio of decrease of thickness becomes smaller in a portion near the tip edge.

3. A seal ring according to claim 1, wherein the first seal lip is formed with a portion having a largest thickness adjacent to the smallest thickness portion on the side of the tip edge, the thickness of the first seal is gradually decreased from the largest thickness portion to the tip edge, and the smallest thickness portion has a concave portion on the side facing the second seal lip.

4. A rolling bearing unit with seal ring, the rolling bearing unit comprising:
   an outer race with an outer raceway in the inner peripheral surface thereof,
   an inner race with the inner raceway on the outer peripheral surface thereof,
   a plurality of rolling members rollingly provided between the outer raceway and the inner raceway, and
   a seal ring closing the opening at the end portion of a space located between the inner peripheral surface of the outer race and the outer peripheral surface of the inner race, the seal ring comprising a first seal lip having a tip edge in sliding contact with a circular ring surface of a rotating member, and a second seal lip located adjacent to and internally to the first seal lip, the second seal lip having a tip edge in sliding contact with a peripheral surface of the rotating member, the tip edge thereof being directed in the same axial direction as the tip edge of the first seal lip, wherein the first seal lip is formed with a portion having a smallest thickness in the vicinity of the base end portion thereof.

5. A rolling bearing unit with seal ring of claim 4, wherein one race of the outer race and the inner race rotatable at the time of use is a hub securely connected to a wheel at the time of use, while the other race of the outer race and the inner race which does not rotate at the time of use is a stationary race supported by a suspension device.

* * * * *